United States Patent [19]

Saito et al.

[11] Patent Number: 4,745,095

[45] Date of Patent: May 17, 1988

[54] PROCESS FOR PREPARATION OF HYDROGEN-ION-EXCHANGED DEALUMINATED MORDENITE

[75] Inventors: Hiroyuki Saito; Takahiko Inoue, both of Tokuyama; Kazushige Igawa, Shinnanyo, all of Japan

[73] Assignee: Toyo Soda Manufacturing Co., Ltd., Shinnanyo, Japan

[21] Appl. No.: 937,111

[22] Filed: Dec. 2, 1986

[30] Foreign Application Priority Data

Dec. 4, 1985 [JP] Japan ................... 60-271597

[51] Int. Cl.$^4$ .................. B01J 29/18; B01J 29/08
[52] U.S. Cl. ......................... 502/78; 502/79
[58] Field of Search ................... 502/78, 79

[56] References Cited

U.S. PATENT DOCUMENTS

| 3,367,884 | 2/1968 | Reid, Jr. ................ 502/78 |
| 3,485,748 | 12/1969 | Eberly, Jr. et al. ........ 502/78 |
| 3,506,400 | 4/1970 | Eberly, Jr. et al. ........ 502/79 |
| 3,597,155 | 8/1971 | Flanigen ................ 502/78 |
| 3,640,681 | 2/1972 | Pickert ................ 502/79 |
| 3,719,026 | 3/1973 | Sand ................... 502/78 |
| 4,093,560 | 6/1978 | Kerr et al. .............. 502/79 |
| 4,447,669 | 5/1984 | Hamon et al. ........... 502/78 |

*Primary Examiner*—Carl F. Dees
*Attorney, Agent, or Firm*—Cushman, Darby & Cushman

[57] ABSTRACT

Hydrogen ion-exchanged dealuminated mordenite having a reduced alumina content is advantageously prepared by filtering a crystallization slurry composed of a crystallization mother liquor and synthetic sodium type mordenite and obtained when the crystallization is completed, through a filter to form a wet cake layer of the sodium type mordenite; passing through the cake layer an aqueous solution of a mineral acid having a concentration of 0.1N to 5N; and then, washing the cake layer.

9 Claims, No Drawings

PROCESS FOR PREPARATION OF HYDROGEN-ION-EXCHANGED DEALUMINATED MORDENITE

BACKGROUND OF THE INVENTION (1) Field of the Invention

The present invention relates to a process for the preparation of hydrogen ion-exchanged mordenite having a reduced aluminum content.

(2) Description of the Related Art

Zeolite is a generic term for crystalline aluminosilicates and has a chemical composition represented by the following formula based on $Al_2O_3$:

$$M_{2/n}O \cdot Al_2O_3 \cdot xSiO_2 \cdot yH_2O$$

wherein

M represents a cation having a valency of n, x is a number of at least 2 and y is a number of at least 0. Mordenite having a five-membered oxygen ring is a zeolite having an x, that is, an $SiO_2/Al_2O_3$ molar ratio, of in which x, that is, the $SiO_2/Al_2O_3$ molar ratio, at least 10, and mordenites with the $SiO_2/Al_2O_3$ molar ratio of about 10 to about 30 are now synthesized. Mordenite is characterized by high heat resistance and high acid resistance and is widely used as an adsorbent or a catalyst for the purification of petroleum, the petroleum chemistry and the prevention of environmental pollution. When mordenite is used as a catalyst, it is ordinarily converted to a hydrogen ion-exchanged type and it is used after adjusting the acid intensity by removing a part of the aluminum of the mordenite. This operation of removing a part of the aluminum is called dealumination. The present invention relates to a process for the preparation of dealuminated mordenite that can be used as a catalyst or a catalyst carrier.

As the known processes for the dealumination of mordenite, there can be mentioned a process in which hydrogen mordenite is calcined at a temperature higher than 350° C. and is then acid-treated with 6N HCl under boiling to increase the $SiO_2/Al_2O_3$ molar ratio to at least 55 (Japanese Examined Patent Publication No. 46-37,166), a process in which mordenite is pulverized and treated with an acid at a temperature of 60° to 100° C. for 10 hours to 14 days to adjust the $SiO_2/Al_2O_3$ molar ratio to 10 to 45 (Japanese Examined Patent Publication No. 51-30,031), a process in which a steam treatment and an acid reflux treatment are repeated to increase the $SiO_2/Al_2O_3$ molar ratio to at least 35 (Japanese Examined Patent Publication No. 51-15,000), a process in which a synthesized sodium mordenite powder having an $SiO_2/Al_2O_3$ molar ratio of 12 to 30 is treated with an acid having a concentration higher than 1N at a temperature of 75° to 125° C. to increase the $SiO_2/Al_2O_3$ molar ratio to at least 40 (Japanese Unexamined Patent Publication No. 46-3,714), and a process in which hydrogen mordenite is heat-treated at a temperature of at least 600° C. in the presence of steam and is then placed in contact with an acid (Japanese Unexamined Patent Publication No. 58-161,916).

These known processes for the preparation of mordenite have a common problem in that an acid treatment must be carried out under severe conditions for a long time or a heat treatment such as calcination must be carried out in combination with such an acid treatment so as to attain an intended high $SiO_2/Al_2O_3$ molar ratio. Accordingly, these known processes are not preferred as an industrial process.

SUMMARY OF THE INVENTION

We carried out research with a view to solve the foregoing problem of the known processes and providing mordenite having a reduced alumina content and a high hydrogen ion-exchange ratio by a simple acid treatment. As the result, it was found that the dealumination by a mineral acid is greatly influenced by the properties of sodium mordenite before the acid treatment, especially by whether or not synthesized mordenite is subjected to a heat treatment such as drying or calcination. More specifically, in the case where synthesized sodium mordenite is subjected to a drying or calcination treatment before the acid treatment, little dealumination by a mineral acid is caused and the $SiO_2/Al_2O_3$ molar ratio cannot be increased by as much as expected. On the other hand, if sodium mordenite which has not been dried or calcined is treated with a mineral acid, the dealumination is accomplished very easily and hydrogen mordenite having a reduced aluminum content, in which the sodium content is low, can be obtained. We have now completed the present invention based on this finding.

More specifically, in accordance with the present invention, there is provided a process for the preparation of hydrogen ion-exchanged dealuminized mordenite wherein synthetic sodium mordenite is treated with an acid to form hydrogen ion-exchanged mordenite having a reduced alumina content, which comprises filtering an aqueous mordenite slurry containing synthetic sodium mordenite which is obtained without drying an as-synthesized sodium mordenite, through a filter to form a wet cake layer of the sodium mordenite; passing through the cake layer an aqueous solution of a mineral acid having a concentration of 0.1N to 5N; and then, washing the cake layer.

DESCRIPTION OF THE PREFERRED EMBODIMENTS

In synthetic sodium mordenite used as the starting material in the present invention, the $SiO_2/Al_2O_3$ molar ratio is not particularly critical, and any sodium mordenite can be used, so far as it is formed by hydrothermal synthesis. It is known that sodium mordenite having an $SiO_2/Al_2O_3$ molar ratio of about 10 to about 30 can be synthesized at present, and this synthetic mordenite is generally used in the present invention. As the aqueous mordenite slurry containing synthetic sodium mordenite which is obtained without drying an as-synthesized sodium mordenite, there can be used a slurry just after completion of crystallization but before solid-liquid separation, which is composed of an as-synthesized sodium mordenite and a crystallization mother liquor; a slurry diluted by adding water to the above-mentioned slurry; and a slurry prepared by separating the mother liquor from the above-mentioned slurry and then adding water to the residue. At any rate, mordenite must not be subjected to a drying treatment.

Any filtering device capable of forming a layer of a cake of a mordenite crystal can be used as the filter for solid-liquid separation. For example, there can be used a belt filter, a centrifugal filter, a filter press and an Oliver filter. In order to perform the acid treatment efficiently, preferably a cake layer is formed so that the bulk density of the cake is not high.

An aqueous solution of a mineral acid is used for the acid treatment. As the mineral acid, there are preferably used hydrochloric acid, nitric acid, and sulfuric acid. In the present invention, the acid concentration may be low. However, if the acid concentration is too low, the dealumination and ion-exchange are not sufficiently advanced. Namely, the intended object of the present invention is attained if the acid concentration is in the range of from 0.1N to 5N, especially from 0.5N to 3.0N. The temperature of the aqueous solution of the mineral acid is an important factor. In the acid treatment process of the present invention, at a higher temperature, the rate of dealumination of the mordenite crystal tends to increase. Accordingly, dealuminated mordenite having an intended $SiO_2/Al_2O_3$ molar ratio can be prepared stably with a good reproducibility by appropriately setting the temperature of the aqueous solution of the mineral acid. Since the dealumination is intended in the present invention, preferably the temperature of the aqueous solution of the mineral acid is at least 20° C.

As the method for passing the aqueous solution of the mineral acid, a method in which the aqueous solution of the mineral acid incessantly flows in a certain direction among particles of the cake layer composed of the sodium mordenite crystal is preferred because the exchange of the sodium ion with a hydrogen ion is performed at a high efficiency and the dealumination is accomplished effectively. Namely, the treatment must be carried out so that the aqueous solution of the mineral acid flows in a certain direction in the cake layer, naturally or forcibly. If the acid treatment is carried out in this manner, the time for the contact of the mordenite crystal with the aqueous solution of the mineral acid, that is, the treatment time is necessarily at least 2 minutes and is preferably at least 5 minutes, although the treatment time varies more or less according the feed rate of the aqueous solution of the mineral acid and the acid concentration. For example, if a method is adopted in which the crystallization slurry is continuously filtered through a belt filter and an aqueous solution of a mineral acid is supplied to the top of the formed cake layer and passed therethrough, the travelling speed of the belt is adjusted so that the cake layer of the mordenite crystal travels through a zone, to which the aqueous solution of the mineral acid is supplied, for a residence (contact) time of at least 2 minutes, preferably at least 5 minutes. Where the cake layer is stationary, the aqueous solution of the mineral acid is passed through this cake layer for at least 2 minutes, preferably at least 5 minutes.

After the acid treatment has been conducted in the above-mentioned manner, the cake is sufficiently washed and dried, whereby hydrogen mordenite having a reduced aluminum content, in which the amount of sodium is small, can be obtained.

According to the present invention, sodium-reduced hydrogen mordenite having an intended high $SiO_2/Al_2O_3$ molar ratio can be prepared by a simple acid treatment without a severe treatment or complicated operation adopted in the conventional processes, such as a long-time treatment at a high acid concentration or a repetition of a calcination treatment and an acid treatment. Accordingly, the preparation process of the present invention is excellent from the industrial viewpoint.

It is presumed that the reason why, according to the acid treatment process of the present invention, the dealumination for preparing hydrogen mordenite is advanced so simply and easily in a short time, as not expected in the known processes, may be as follows.

Since synthetic mordenite is prepared by subjecting a reaction mixture comprising a silica source, an alumina source and an alkali source to hydrothermal synthesis, the mother liquor left after the crystallization is alkaline. Conventionally, after solid-liquid separation, the solid is washed to remove the adhering alkali component and the washed solid is dried to obtain sodium mordenite powder. The particle size of mordenite is very small and is smaller than several microns, and mordenite has in the interior thereof fine pores inherent to zeolite. Accordingly, it is very difficult to completely remove the adhering alkali component from the zeolite, and in the industrial-scale production, washing is very often insufficient. During evaporation of water by drying, this slight amount of the adhering alkali component is precipitated on the surfaces of the zeolites particles or in the interior pores to cover the surfaces or clog the pores and inhibit the contact with an acid at the acid treatment, with the result that the dealumination reaction and hydrogen ion-exchange become insufficient. In fact, we made experiments for clarifying the relationship between the degree of washing of synthetic sodium mordenite and the rate of dealumination by the acid treatment of dry powder, and as a result, it was confirmed that the dealuminizing effect is increased with increase of the washing degree and that the dealuminizing effect is reduced by the calcination and the dealumination is not substantially advanced if the calcination temperature is within a certain range.

The process of the present invention will now be described in detail with reference to the following examples.

EXAMPLES 1 THROUGH 3

1,000 g of a crystallization slurry (solid concentration=12.9% by weight) comprising a sodium mordenite crystal having an $SiO_2/Al_2O_3$ molar ratio of 14.9 and a crystallization mother liquor, which was obtained as hydrothermal synthesis was completed, was filtered under a vacuum of 400 mmHg by using a ceramic Buchner funnel (formed of a polypropylene filter fabric PF660 supplied by Nakao Filter Cloth Co.) having a filtration area of 314 $cm^2$. After the filtration, the filter cake was washed with 400 ml of warm water. Then, 2,300 ml of 0.8N HCl maintained at 20° C. (Example 1), 50° C. (Example 2) or 80° C. (Example 3) was passed through the cake layer for 10 minutes while sucking the cake layer. After HCl had been passed, the cake layer was sufficiently washed with water and then dried. When the composition of the obtained crystal was determined by chemical analysis, it was found that the $SiO_2/Al_2O_3$ molar ratio was 20.8 (Example 1), 29.3 (Example 2) or 48.7 (Example 3) and in each case, the $Na_2O$ content was lower than the detection limit of 0.05% by weight. Furthermore, in each case, the crystallinity (relative X-ray diffraction intensity) was higher than 95% based on the starting mordenite.

COMPARATIVE EXAMPLES 1 AND 2

A sodium mordenited cake obtained by filtration and washing in the same manner as described in Example 1 was dried at 120° C. for 4 hours (Comparative Example 1) or thus dried and then calcined in air at 500° C. for 1 hour (Comparative Example 2). Then, 129 g (on the dry base) of the sodium mordenite was formed into a slurry again by using 870 ml of water, and the slurry was filtered. Then, 2,300 ml of 0.8N HCl at 50° C. was passed through the cake layer for 10 minutes, and the cake layer was sufficiently washed with water. In the obtained crystal, the SiO$_2$/Al$_2$O$_3$ molar ratio was 21.2 (Comparative Example 1) or 16.8 (Comparative Example 2) and the Na$_2$O content was 0.13% by weight or 0.25% by weight.

EXAMPLE 4

Hydrogen mordenite was prepared in the same manner as described in Example 2 except that HNO$_3$ was used as the mineral acid instead of HCl. From the results of the chemical analysis, it was found that the SiO$_2$/Al$_2$O$_3$ molar ratio was 28.9, the Na$_2$O content was lower than 0.05% by weight and the crystallinity was 98%.

EXAMPLE 5

A crystallization slurry comprising a sodium mordenite crystal having an SiO$_2$/Al$_2$O$_3$ molar ratio of 19.9 and a crystallization mother liquor was subjected to decantation to remove the mother liquor, and a slurry obtained by adding water to the residue was acid-treated under the same conditions as adopted in Example 1. In the obtained hydrogen mordenite, the SiO$_2$/Al$_2$O$_3$ molar ratio was 30.7, the Na$_2$O content was lower than 0.05% by weight and the crystallinity was 99%.

We claim:

1. A process for the preparation of hydrogen ion-exchanged dealuminized mordenite wherein synthetic sodium mordenite is treated with an acid to form hydrogen ion-exchanged mordenite having a reduced alumina content, which comprises:

filtering an aqueous mordenite slurry containing synthetic sodium mordenite which is obtained without drying an as-synthesized sodium mordenite, through a filter to form a wet cake layer of the sodium mordenite;

passing through the cake layer an aqueous solution of a mineral acid having a concentration of 0.1N to 5N; and then, washing the cake layer.

2. A process according to claim 1, wherein the mineral acid is hydrochloric acid, nitric acid or sulfuric acid.

3. A process according to claim 1, wherein the temperature of the aqueous solution of the mineral acid is higher than 20° C.

4. A process according to claim 1, wherein the treatment time for passing the mineral acid through the cake layer is at least 2 minutes.

5. A process according to claim 1, wherein the aqueous solution of the mineral acid has a concentration of 0.5N to 3.0N.

6. A process according to claim 1, wherein the synthetic sodium mordenite has a SiO$_2$/Al$_2$O$_3$ molar ratio of about 10 to about 30.

7. A process according to claim 1, wherein the aqueous mordenite slurry is an aqueous slurry composed of an as-synthesized sodium mordenite and a crystallization mother liquor.

8. A process according to claim 1, wherein the aqueous mordenite slurry is an aqueous slurry prepared by diluting with water a slurry composed of an as-synthesized sodium mordenite and a crystallization mother liquor.

9. A process according to claim 1, wherein the aqueous mordenite slurry is an aqueous slurry prepared by separating a mother liquor from a slurry composed of an as-synthesized sodium mordenite and the mother liquor, and then adding water to the residue.

* * * * *